S. A. MASCIA.
VEGETABLE WASHER.
APPLICATION FILED AUG. 9, 1909.

974,165.

Patented Nov. 1, 1910.

Witnesses:

Inventor:
Saverio A. Mascia
By his Attorney

UNITED STATES PATENT OFFICE.

SAVERIO A. MASCIA, OF NEW YORK, N. Y.

VEGETABLE-WASHER.

974,165.

Specification of Letters Patent. Patented Nov. 1, 1910.

Application filed August 9, 1909. Serial No. 512,032.

*To all whom it may concern:*

Be it known that I, SAVERIO A. MASCIA, a citizen of the United States, residing in the borough of the Bronx, city, county, and State of New York, have invented certain new and useful Improvements in Vegetable-Washers, of which the following is a specification.

My improvements relate to washers for cleaning and straining vegetables, &c., and are designed to afford a simple, cheap and effective apparatus whereby vegetables, or other articles to be cleansed preparatory to cooking or other subsequent treatment may be introduced into a rotatable cylindrical cage, washed and drained therein, and both the cage and its contents then removed from the apparatus, substantially as hereinafter set forth.

The invention consists in the specific construction and arrangement of parts herein shown, described and claimed, distinguishing features being the use of a spray stand pipe adapted to receive and support one end of the vegetable cage, and the latter provided with a journal crank which also answers as a handle in manipulating and transporting the cage when the latter is inserted in position in the apparatus or withdrawn therefrom for the purpose of transferring the cleansed vegetables to a boiler, or otherwise disposing of them.

Figure 1:
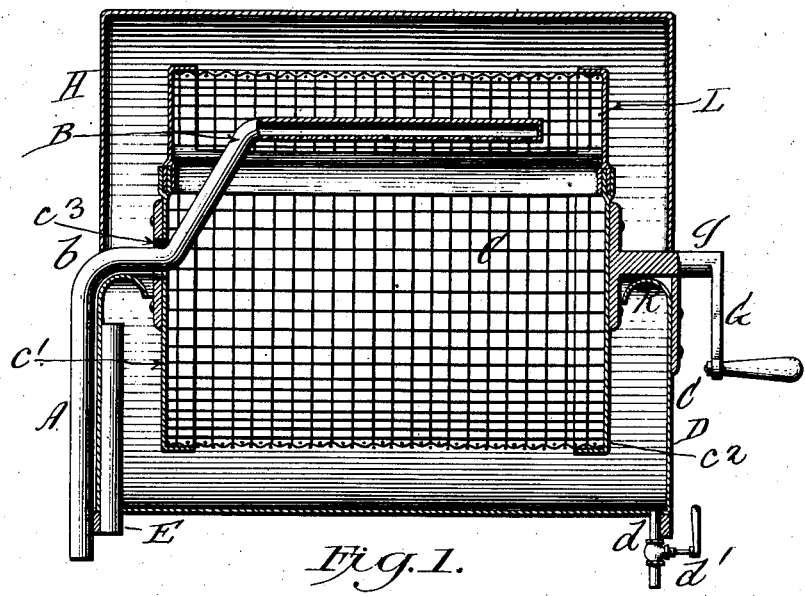
Figure 2:
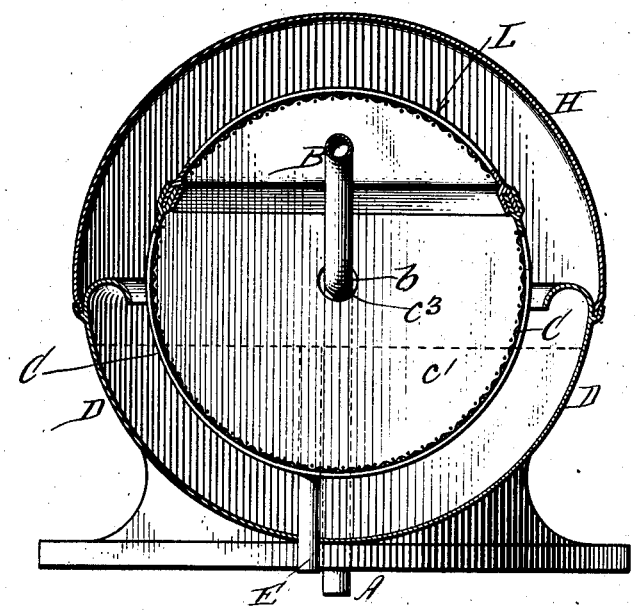

In the accompanying drawings, Figure 1, is a sectional side elevation of my improved vegetable washer, and Fig. 2, a sectional end elevation of the same.

D, is a semi-cylindrical tank into the bottom of which enters a drain pipe $d$, provided with a valve $d'$. The edges of the tank D are inturned and bent downward to form return flanges, over which fits the semi-cylindrical cover H.

A is an external water supply pipe connected with the internal spray stand pipe B.
The lower member $b$, of this spray stand pipe which connects with the external supply pipe A is arranged axially with relation to the semi-cylindrical tank D, and forms a stationary bearing or journal for one end of the vegetable cage C. From this lower member $b$, the spray standing pipe is bent upward and longitudinally above and with relation to the axis of the apparatus, and is formed with holes, through which the water is ejected to cleanse the material in the cage C.

E, is an overflow stand pipe arranged to limit the water level in the tank and carry off any excess of water.

The cage C consists of a cylindrical shell of woven wire, or other perforate metal, closed by and attached to disks $c'$ and $c^2$—that at the left hand side $c'$, being formed with a central annular bearing $c^3$, adapted to fit and pass over the spray pipe B on the lower member $b$, of which this end of the cage C is supported. To the center of the other disk $c^2$ is secured a journal $g$, and crank G, the journal $g$ resting in a bearing $k$, provided for it on that end of the semi-cylindrical tank D. The journal $g$, is not capped to this bearing and may be raised therefrom. The cage C is provided with a movable section L, secured in position by any suitable mechanical expedient.

In practical use the cover H is lifted off the tank D, the section L, of the cage removed for the insertion of the vegetables, and then replaced, after which the cover H, is again placed over the tank D. Water is then introduced through the pipe A, causing the spray stand pipe to eject water among the vegetables, the cage C being meanwhile rotated by means of the crank G. Overflow is carried off through the stand pipe E. The residual water is withdrawn whenever desired by opening the valve $d'$, in the discharge pipe $d$. When the vegetables have been thoroughly cleansed and drained the cover H is removed, and the cage withdrawn by raising the crank G, and journal $g$, and sliding the annular bearing $c^3$ over and from the spray stand pipe B.

What I claim as my invention and desire to secure by Letters Patent is,

In a device of the character described, the combination with the semi-cylindrical tank and cover, of the spray stand pipe supported axially in the tank and projecting upward above the axial line of same, the perforate cylindrical cage formed with a central annular bearing in one end disk adapted to fit and pass over the spray stand pipe and with a journal and crank attached to the other end disk the journal being adapted to rest on a bearing formed for its reception on that end of the tank, said end disks, a water supply pipe, an overflow pipe and a discharge pipe connected with the tank, the whole arranged and operating substantially in the manner and for the purpose described.

Signed at New York city in the county of New York and State of New York this seventh day of August A. D. 1909.

SAVERIO A. MASCIA.

Witnesses:
 FLORENTIN RIGOTTI,
 VINCENT VALENTE.